United States Patent [19]

Clegg

[11] Patent Number: 4,572,621
[45] Date of Patent: Feb. 25, 1986

[54] CONICAL BEAM CONCENTRATOR

[76] Inventor: John E. Clegg, 2320 Keystone Dr., Orlando, Fla. 32806

[21] Appl. No.: 651,365

[22] Filed: Sep. 17, 1984

[51] Int. Cl.⁴ .................... G02B 13/18; G02B 17/08
[52] U.S. Cl. .................................. 350/432; 350/443; 350/628
[58] Field of Search ................ 350/432, 443, 628

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clegg | 350/432 |

*Primary Examiner*—John K. Corbin
*Assistant Examiner*—Rebecca D. Gass

[57] ABSTRACT

Two conical component lenses and a cylindrical mirror which receive an incipient whole beam and emit a concentrated whole beam.

1 Claim, 2 Drawing Figures

CONICAL BEAM CONCENTRATOR

BACKGROUND

The concentrator has a code designation of RT-L-RT:C (R-refracting section of a component lens, T-transmitting section of a component lens, L-reflecting section of a component lens, C-concentrating stage lens).

Prior art includes the following patents:

*Biconical Refractor*, U.S. Pat. No. 2,881,654, 4/14/59, D. S. Toffolo. This is a beam concentrator with an upper component lens which receives an annular incipient beam and is therefore only 60% effective.

*Conical Refractor*, U.S. Pat. No. 2,882,784, 4/14/59, D. S. Toffolo. This also is a beam concentrator with an upper component lens which receives an annular incipient beam.

*Conical Split-Image Microscopic Lens*, U.S. Pat. No. 4,277,148, 7/7/81, by this inventor. This is a stage lens with three component lenses which receive a whole incident beam and emit a whole enlarged beam.

*Reflective Beam Concentrator*, U.S. Pat. No. 4,325,612, 4/20/82, by this inventor. This is a beam concentrator which has a lower component lens identical to the lower component lens of the subject disclosure.

*Conical Beam Concentrator*, U.S. Pat. No. 4,333,713, 6/8/82, by this inventor. This is a beam concentrator which has a lower component lens identical to that of the subject disclosure.

DRAWINGS

DESCRIPTION

Figure 1:
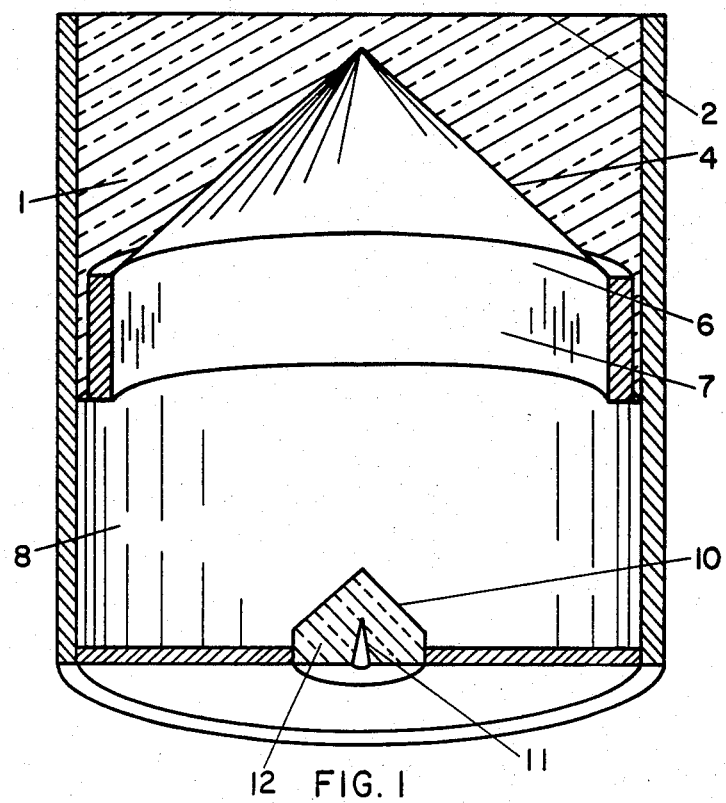
FIG. 1 is an elevation of the conical beam concentrator with the lenses shown in section.
Figure 2:
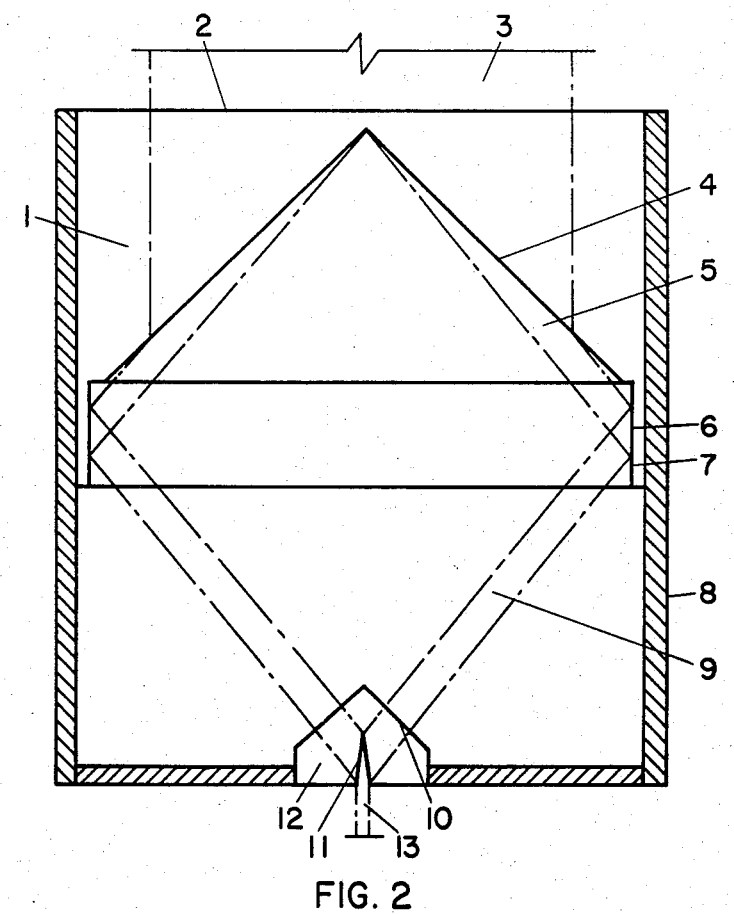
FIG. 2 is a sectional view of the conical beam concentrator with a ray diagram.

FIG. 2 shows the conical beam concentrator with upper component lens RT 1 with planar section 2 which receives and transmits an incipient whole bem 3 to concave conical section 4 which refracts and emits the beam, forming divergent conical beam 5.

Beam 5 is reflected off the inner reflective wall 6 of concave cylindrical mirror 7 which is mounted inside tubular casing 8.

Convergent conical beam 9 is transmitted by convex conical section 10 and refracted by concave conical section 11 of lower component lens RT 12, forming concentrated whole beam 13 which is emitted parallel to the vertical axis of the lenses.

The diameter of incipient beam 3 is 100 mm, and the diameter of concentrated beam 13 is 2 mm. The reduction in size of concentrated beam 13 is 0.02 1/X, and the intensity (area of incipient beam/area of concentrated beam) of concentrated beam 13 is 2500 I.

The concentrator cannot be used as a magnifying lens, because the image is reversed by the mirror.

I claim:

1. A conical beam concentrator comprising two component lenses (1,12) and a cylindrical mirror (7) which receive an incipient whole beam (3) and emit a concentrated whole beam (13), comprising:
    a. Upper component lens RT (1) with planar section (2) which receives and transmits incipient whole beam (3), and with a concave conical section (4) which refracts beam (3), forming divergent conical beam (5),
    b. Concave cylindrical mirror (7) mounted below upper component lens RT (1), with an inner reflective wall (6) which reflects beam (5) inward, forming convergent conical beam (9), and
    c. Lower component lens RT (12) mounted below concave cylindrical mirror (7), with a convex conical section (10) which transmits beam (9), and with a concve conical section (11) which refracts beam (9), forming concentrated whole beam (13) which is emitted parallel to the vertical axis of the lenses.

* * * * *